(12) United States Patent
Carreno Del Pino et al.

(10) Patent No.: US 12,455,014 B2
(45) Date of Patent: Oct. 28, 2025

(54) HYDRAULIC FUSE

(71) Applicant: ROLLS-ROYCE plc, London (GB)

(72) Inventors: Jorge Carreno Del Pino, Bristol (GB);
Hassan S. Daginawalla, Bristol (GB);
Samuel J. Lawrence, Bristol (GB);
Harry A. Nichols, Bristol (GB);
Michael Yeandel, Bristol (GB); **Gareth
L. Jones**, Caldicot (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/538,259

(22) Filed: Dec. 13, 2023

(65) Prior Publication Data

US 2024/0229951 A1 Jul. 11, 2024

(30) Foreign Application Priority Data

Jan. 10, 2023 (GB) ..................................... 2300321

(51) Int. Cl.
*F16K 17/30* (2006.01)
*B33Y 80/00* (2015.01)
*F16K 17/16* (2006.01)

(52) U.S. Cl.
CPC ............... *F16K 17/30* (2013.01); *B33Y 80/00* (2014.12); *F16K 17/16* (2013.01); *Y10T 137/1714* (2015.04)

(58) Field of Classification Search
CPC .. F16K 17/16; F16K 17/162; Y10T 137/1699; Y10T 137/1707; Y10T 137/1714; Y10T 137/1744
See application file for complete search history.

(56) References Cited

U.S. PATENT DOCUMENTS

| 1,485,913 | A |   | 3/1924  | Gottlieb |
| 1,584,523 | A |   | 5/1926  | Egbert |
| 2,387,353 | A |   | 10/1945 | Raymond |
| 2,661,121 | A | * | 12/1953 | Coffman ................. F16K 17/16 220/89.2 |

(Continued)

FOREIGN PATENT DOCUMENTS

| GB | 861289 A   | 2/1961 |
| GB | 2091808 A  | 8/1982 |
| JP | S5683670 A | 7/1981 |

OTHER PUBLICATIONS

Great Britain search report dated Jul. 12, 2023, issued in GB Patent Application No. GB 2300321.3.

(Continued)

*Primary Examiner* — Robert K Arundale

(57) ABSTRACT

The present disclosure relates to a hydraulic fuse comprising: a fuse body defining a plenum, the plenum comprising: an inlet configured to couple to a first fluid location; and an outlet configured to couple to a second fluid location. The hydraulic fuse further comprises a first fuse element arranged to close the inlet, the first fuse element configured to open the inlet when a pressure differential between the first fluid location and the plenum reaches a first threshold; and a second fuse element arranged to close the outlet, the second fuse element configured to open the outlet when a pressure differential between the plenum and the second fluid location reaches a second threshold, wherein the first threshold is higher than the second threshold.

19 Claims, 8 Drawing Sheets

(56) References Cited

U.S. PATENT DOCUMENTS

| | | | |
|---|---|---|---|
| 2,788,794 A | | 4/1957 | Holinger |
| 2,895,492 A | * | 7/1959 | Bell ........................ F16K 17/16 |
| | | | 137/340 |
| 3,092,286 A | | 6/1963 | Duff |
| 3,448,750 A | * | 6/1969 | Parks ....................... B01J 3/002 |
| | | | 137/69 |
| 4,263,929 A | * | 4/1981 | Kearney ................. F16K 17/16 |
| | | | 137/557 |
| 4,951,697 A | | 8/1990 | Fritts |
| 9,969,501 B2 | * | 5/2018 | Haskins ................. B64D 45/00 |
| 2023/0091675 A1 | * | 3/2023 | Eidam ............... H01M 50/3425 |
| | | | 137/68.23 |

OTHER PUBLICATIONS

European search report dated May 15, 2024 issued in EP Patent application No. 23215586.1.

* cited by examiner

HYDRAULIC FUSE

CROSS-REFERENCE TO RELATED APPLICATIONS

This disclosure claims the benefit of UK Patent Application No. GB 2300321.3, filed on 10 Jan. 2023, which is hereby incorporated herein in its entirety.

BACKGROUND

Technical Field

The present disclosure relates to a hydraulic fuse and a hydraulic manifold.

Description of the Related Art

A hydraulic manifold or fluidic tube gallery is a component that allows one or more fluids to enter and exit using various machined, cast, or otherwise manufactured fluid conduits. The conduits form a single component which reduces the overall packaging size and complexity when compared to standard pipes or tubes. The hydraulic manifold typically forms part of a fluid system, which can include a pump for driving the fluid through the system. In conventional hydraulic manifolds, in case of an overpressure event, such as that caused by a blocked conduit, the manifold is designed to contain the fluid until another component in the fluid system, such as the pump, fails.

Overpressure events can also be controlled by other methods, such as by using pressure relief valves or burst disks. Pressure relief valves are designed to open at a predetermined pressure to protect fluid systems from overpressure events. However, pressure relief valves are typically bulky, making them unsuitable for certain types of hydraulic manifolds. They can also suffer from reliability issues and can create areas of pressure loss within the fluid system. Burst disks are designed to rupture at a predetermined pressure differential across the disk to protect fluid systems from overpressure events. However, burst disks are not as effective when there is a transient pressure differential across the disk, and can burst unreliably.

There is therefore a need to develop a solution to address at least some of the aforementioned problems.

SUMMARY

According to a first aspect of the present disclosure, there is provided a hydraulic fuse comprising: a fuse body defining a plenum, the plenum comprising: an inlet configured to couple to a first fluid location; and an outlet configured to couple to a second fluid location. The hydraulic fuse further comprises a first fuse element arranged to close the inlet, the first fuse element configured to open the inlet when a pressure differential between the first fluid location and the plenum reaches a first threshold; and a second fuse element arranged to close the outlet, the second fuse element configured to open the outlet when a pressure differential between the plenum and the second fluid location reaches a second threshold, wherein the first threshold is higher than the second threshold. In an inactive state, the inlet is closed by the first fuse element and the outlet is closed by the second fuse element to prevent fluid flow through the plenum; and in an active state, the pressure differential between the first fluid location and the plenum reaches the first threshold to cause the first fuse element to open and permit fluid flow through the inlet, and the pressure differential between the plenum and the second fluid location reaches the second threshold to cause the second fuse element to open and permit fluid flow through the outlet.

The first fuse element may be frangible, such that the first fuse element is configured to fracture and open the inlet when the pressure differential between the first fluid location and the plenum reaches the first threshold. The second fuse element may be frangible, such that the second fuse element is configured to fracture and open the outlet when the pressure differential between the plenum and the second fluid location reaches the second threshold.

The first fuse element and/or the second fuse element may be configured to fracture at a respective predetermined fracture point.

The first fuse element and/or the second fuse element may be configured to fracture in a brittle manner.

The first fuse element and/or the second fuse element may be configured to fracture in a ductile manner.

The first fuse element and the second fuse element may be integrally formed with the fuse body.

The first fuse element and the second fuse element may each comprise a respective retention feature configured to retain the first fuse element and the second fuse element within the plenum in the active state.

The retention feature may be larger than the inlet and outlet.

The first fuse element and/or the second fuse element may be flexibly attached to the fuse body, such that in the active state, the first fuse element and/or the second fuse element may be configured to bend and remain attached to the fuse body to provide the retention feature.

The first fuse element and/or the second fuse element may comprise a plurality of ridges formed on a surface facing into the plenum.

The first fuse element and the second fuse element may be contained within a volume circumscribed by the fuse body.

In the inactive state, the first fuse element and the fuse body may form a substantially continuous fluid-washed surface facing the first fluid location, and the second fuse element and the fuse body may form a substantially continuous fluid-washed surface facing the second fluid location.

The hydraulic fuse may be formed by an additive manufacturing process.

The hydraulic fuse may further comprise: an extraction hole opening into the plenum; and a sealing element configured to close the extraction hole.

According to a second aspect of the present disclosure, there is provided a hydraulic manifold comprising: a first fluid conduit and a second fluid conduit separated by a manifold wall; and a hydraulic fuse according to the first aspect, wherein the hydraulic fuse is disposed in the manifold wall between the first fluid conduit and the second fluid conduit, such that the first fluid location is in the first fluid conduit and the second fluid location is in the second fluid conduit.

The hydraulic fuse may be integrally formed with the manifold wall.

The hydraulic manifold may be formed by an additive manufacturing process.

According to a third aspect of the present disclosure, there is provided a hydraulic manifold comprising: a fluid conduit defined by a manifold wall; and a hydraulic fuse according to the first aspect; wherein the hydraulic fuse is attached to the manifold wall, such that the first fluid location is in the fluid conduit and the second fluid location is an environment surrounding the hydraulic manifold.

The hydraulic fuse may be integrally formed with the manifold wall.

The hydraulic manifold may be formed by an additive manufacturing process.

BRIEF DESCRIPTION OF THE DRAWINGS

Embodiments will now be described by way of example only, with reference to the Figures, in which.

DETAILED DESCRIPTION

Figure 1:
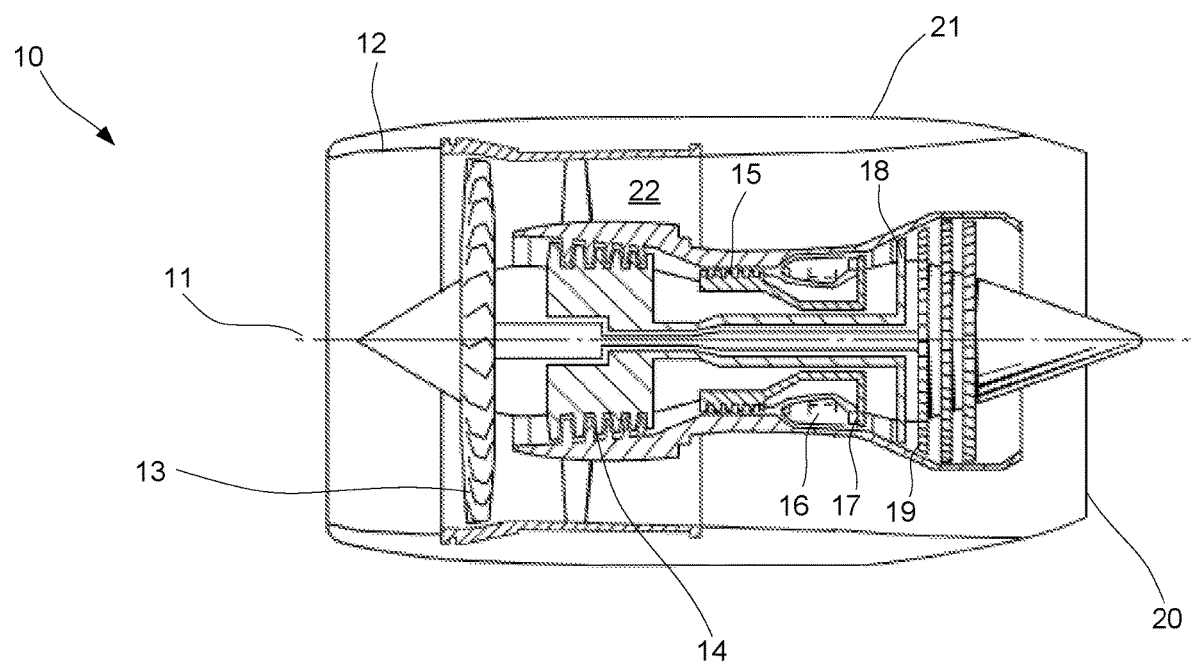
FIG. 1 is a schematic sectional view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g., two) and/or an alternative number of compressors and/or turbines. Further the engine may comprise a gearbox provided in the drive train from a turbine to a compressor and/or fan.

Figure 2:
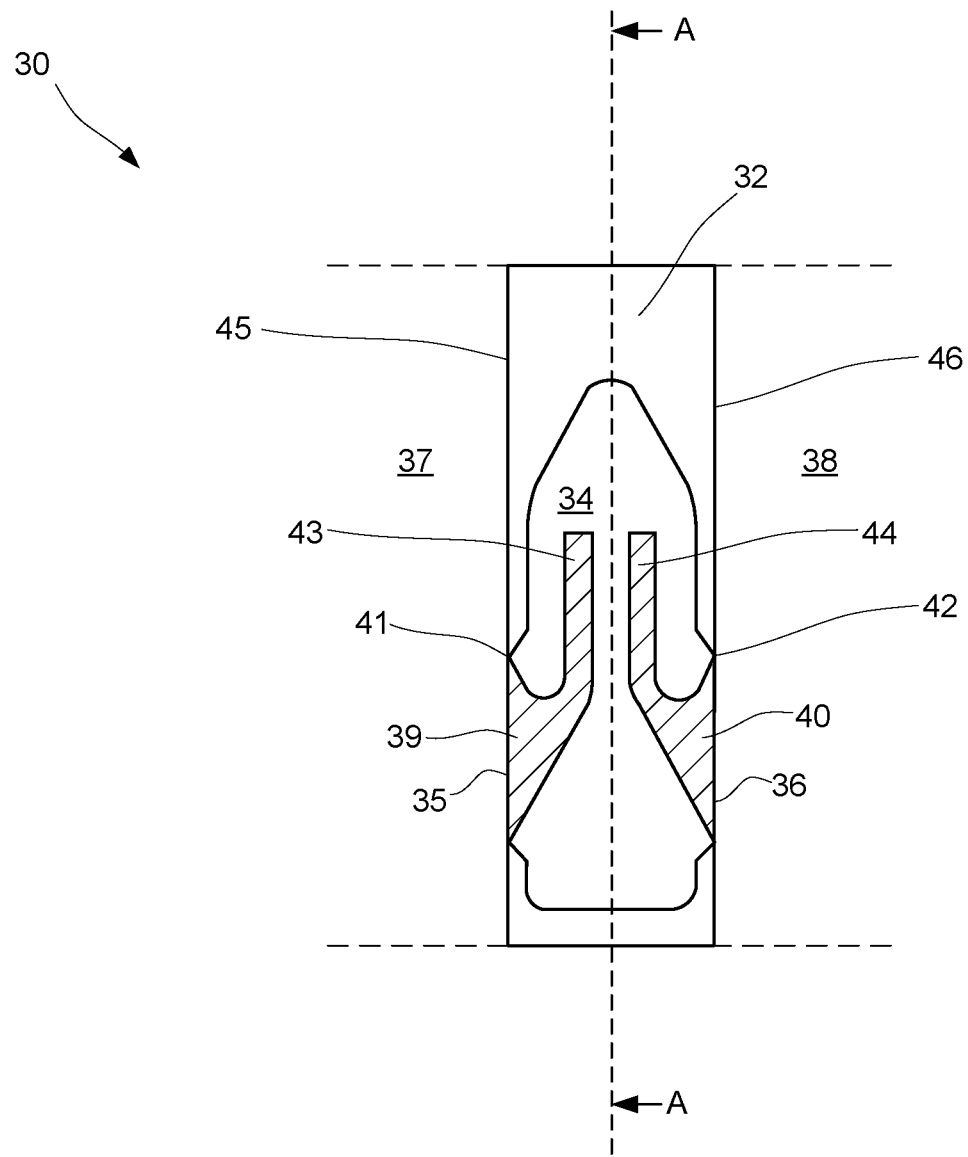
FIG. 2 is a sectional side view of a first example hydraulic fuse according to the present disclosure.

In fluid systems, such as for fluid systems used in a gas turbine engine, a hydraulic fuse can be used to mitigate fluid overpressure events in the system in case of system failure, for example caused by blockages. A first example of a hydraulic fuse according to the present disclosure is shown in FIG. 2. The hydraulic fuse 30 comprises a fuse body 32, a first fuse element 39, and a second fuse element 40. The fuse body 32 defines a plenum 34. The plenum 34 has an inlet 35 and an outlet 36. The inlet 35 is configured to fluidly couple to a first fluid location 37. The outlet 38 is configured to fluidly couple to a second fluid location 38. The first fluid location 37 and the second fluid location 38 may be in fluid conduits which are part of the same fluid system or may be coupled to different sources of fluid. The second fluid location 38 may be in ambient conditions, and may for example, contain or comprise fluid at atmospheric pressure. The first fluid location 37 contains fluid which is at a generally higher fluid pressure than in the second fluid location 38. The plenum 34 may contain fluid at atmospheric pressure.

The first fuse element 39 is arranged to close the inlet 35, such that fluid is prevented from entering the plenum 34 from the first fluid location 37, via the inlet 35. The second fuse element 40 is arranged to close the outlet 36, such that fluid is prevented from flowing between the plenum 34 and the second fluid location 38. The first fuse element 39 and the second fuse element 40 are integrally formed with the fuse body 32. In particular, the first fuse element 39 is formed integrally with a wall of the fuse body 32 which faces the first fluid location 37, and the second fuse element 40 is formed integrally with a wall of the fuse body 32 which faces the second fluid location 38.

Figure 3:
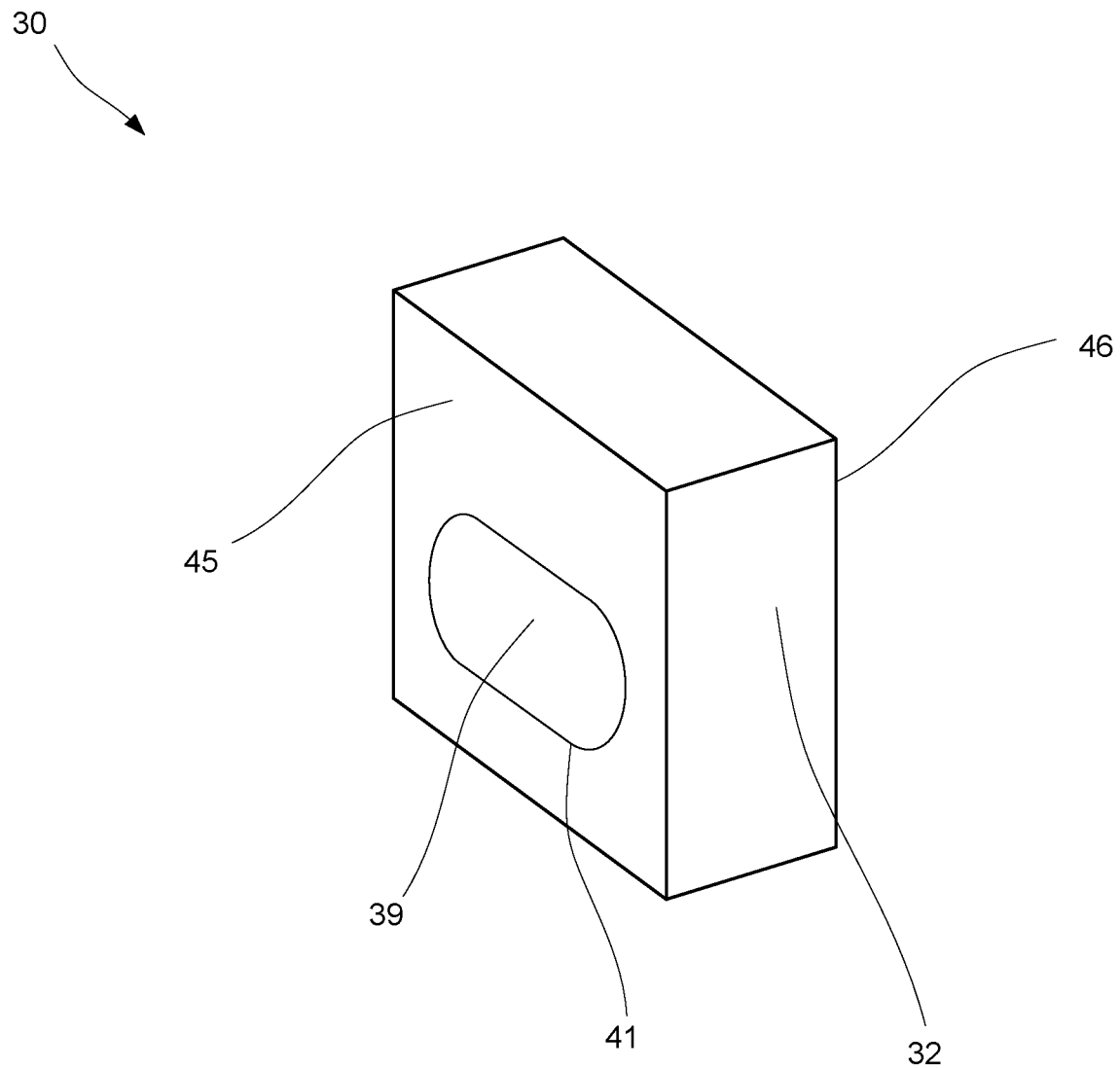
FIG. 3 is an isometric view of the first example hydraulic fuse as shown in FIG. 2.

The first fuse element 39 and the second fuse element 40 are frangible, i.e., they are configured to be breakable. The first fuse element 39 and the second fuse element 40 may be configured to break in a brittle manner by bursting or shattering, or by breaking in a ductile manner by tearing. This may be enabled by varying the materials used for the first and second fuse elements or by varying the structure of the first and second fuse elements. The first fuse element 39 has a first thin wall section 41, which forms a first weak point between the first fuse element 39 and the fuse body 32, and the second fuse element 40 has a second thin wall section 42, which forms a second weak point between the second fuse element 40 and the fuse body 32. The first weak point and the second weak point form predetermined fracture points for the first and second fuse element 39, 40, respectively, such that the first fuse element 39 and the second fuse element 40 are designed to break at the first and second weak points, respectively. FIG. 3 shows an isometric view of the hydraulic fuse 30, showing a side 45 of the hydraulic fuse 30 which faces the first fluid location 37. The first thin wall section 41 extends around the perimeter of the portion of the first fuse element 39 which is formed as part of the wall of the fuse body 32. In addition, the second thin wall section 42 extends around the perimeter of the portion of the second fuse element 40 which is formed as part of the wall of the fuse body 32. The first thin wall section 41 is configured to break or burst when a fluid pressure differential between the first fluid location 37 and the plenum 34 reaches or exceeds a first threshold pressure. The second thin wall section 42 is configured to break or burst when a fluid pressure differential between the plenum 34 and the second fluid location 38 reaches or exceeds a second threshold pressure. The first threshold pressure is higher than the second threshold pressure. In this context, breaking or bursting means that the first thin wall section 41 is broken to at least partially open the inlet 35 and allow fluid to flow from the first fluid location 37 to the plenum 34, and the second thin wall section 42 is broken to at least partially open the outlet 36 and allow fluid to flow from the plenum 34 to the second fluid location 38. The first thin wall section 41 and the second thin wall section 42 may be configured by any means to enable it to burst at or above the first threshold pressure and the second threshold pressure, respectively. For example, the thickness of the thin wall sections, the surface area of the thin wall sections, and/or the materials of the thin wall sections may be selected or varied to tune or design the thin wall sections to burst at or above the desired pressure thresholds. For example, the first thin wall section 41 may have a greater thickness than the second thin wall section 42 to enable it to burst at a higher pressure than the second thin wall section 42.

The first fuse element 39 and the second fuse element 40 are contained within the volume defined by the fuse body 32. As shown in FIG. 3, the first fuse element 39 and the fuse body 32 together form a first smooth, substantially continuous surface 45 of the fuse body 32 which faces the first fluid location 37. Here, the first fuse element 39 is formed integrally with the fuse body 32 to form the substantially continuous surface 45 which faces the first fluid location 37. Similarly, the second fuse element 40 and the fuse body 32 together form a second smooth, substantially continuous surface 46 of the fuse body 32 which faces the second fluid location 38. Here, the second fuse element 40 is formed integrally with the fuse body 32 to form the substantially continuous surface 46 which faces the first fluid location 38. The substantially continuous surfaces 45, 46 form substantially smooth fluid-washed surfaces which are exposed to fluid flow. The smooth surfaces ensure that there is negligible pressure loss created by the hydraulic fuse 30 when it is used in a fluid system.

Figure 4:
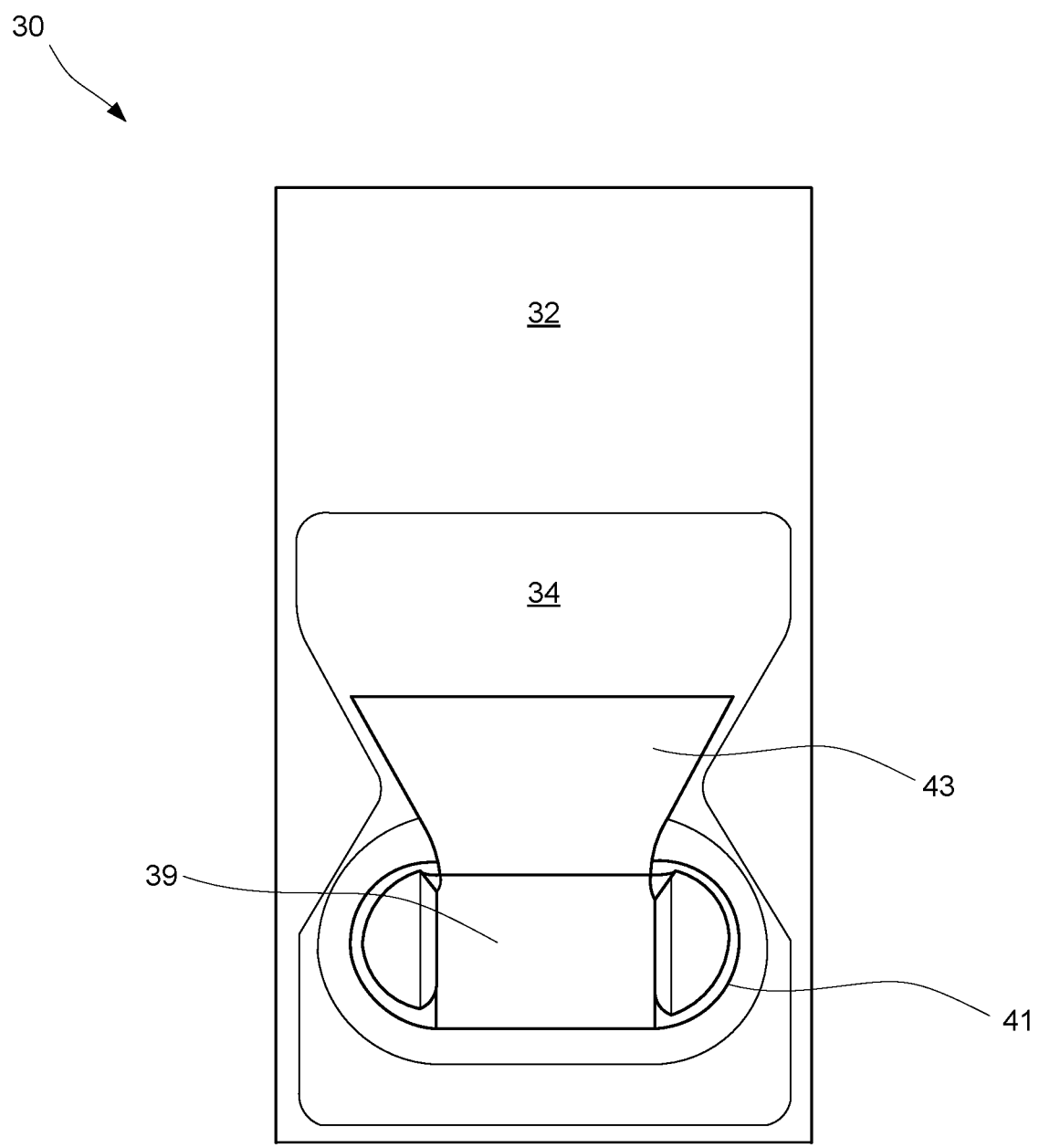
FIG. 4 is a sectional view of the first example hydraulic fuse through the line marked A-A as shown in FIG. 2.

FIG. 4 is a section view of the hydraulic fuse 30 through the plane marked A-A in FIG. 2. The first fuse element 39 comprises a retention feature 43 which is configured to retain the first fuse element 39 within the plenum 34. The retention feature 43 comprises a first dovetail-shaped portion 43 which is integrally formed with the portion of the first fuse element 39 which is arranged to close the inlet 35. The width of the first dovetail-shaped portion 43 is greater than the width of the inlet 35. After the first fuse element 39 is broken off the fuse body 32 when the first thin wall section 41 is broken, the first dovetail-shaped portion 43 prevents the first fuse element 39 from leaving the plenum 34 via the inlet 35, thereby retaining the first fuse element 39 within the plenum 34. Similarly, the second fuse element 40 also comprises a retention feature 44 which is configured to retain the second fuse element 40 within the plenum 34. The retention feature 44 comprises a second dovetail-shaped portion 44 which is integrally formed with the portion of the second fuse element 40 which is arranged to close the outlet 36. The width of the second dovetail-shaped portion 44 is greater than the width of the outlet 36. After the second fuse element 40 is broken off the fuse body 32 when the second thin wall section 42 is broken, the second dovetail-shaped portion 44 prevents the second fuse element 40 from leaving the plenum 34 via the outlet 36, thereby retaining the second fuse element 40 within the plenum 34. In other examples, the retention feature 43, 44 may be any feature which enables the first fuse element 39 and the second fuse element 40 to be retained within the plenum 34 when the first fuse element 39 and the second fuse element 40 are broken. For example, the retention feature may comprise a flexible member which enables the first fuse element 39 and the second fuse element to remain attached to the fuse body 32 even when the first fuse element 39 and the second fuse element 40 are broken. In other examples, the retention feature may comprise a connecting member between the first fuse element 39 and the second fuse element 40 which connects the first fuse element 39 and the second fuse element 40 together.

The hydraulic fuse 30 may be formed from an additive manufacturing process. The additive manufacturing process may be used to integrally form the fuse body 32, the first fuse element 39, and the second fuse element 40. The additive manufacturing process may include a powder bed process, a material deposition process, or a 3D printing process. For example, the powder bed process may be a laser powder bed process. Alternatively, the hydraulic fuse 30 may be formed from a casting process. The hydraulic fuse 30 may be formed from any material suitable for the desired use. For example, the hydraulic fuse 30 may be formed from a metal.

In use, the hydraulic fuse 30 is arranged between the first fluid location 37 and the second fluid location 38. In particular, the inlet 36 is coupled to the first fluid location 37 and the outlet is coupled to the second fluid location 38. Generally, the first fluid location 37 will be at a higher fluid pressure than the second fluid location 38. In normal operation, the hydraulic fuse 30 is in an inactive state, as shown in FIG. 2. Fluid at the first fluid location 37 will flow past the first substantially continuous surface 45 of the hydraulic fuse 30 and fluid at the second fluid location 38 will flow past the second substantially continuous surface 46 of the hydraulic fuse 30. In the inactive state, the first fuse element 39 closes the inlet 35 and the second fuse element 40 closes the outlet 36, which prevents fluid flow into and through the plenum 34. The fluid pressure in the plenum 34 may be at atmospheric pressure. During a fluid overpressure event, such as a blockage in one of the fluid locations, the pressure in the fluid locations may increase. The hydraulic fuse 30 is caused to move to an active state when the pressure differential between the first fluid location 37 and the plenum 34 reaches the first threshold. When the pressure differential between the first fluid location 37 and the plenum 34 reaches the first threshold, the first fuse element 39 is configured to break at the first thin wall section 41 and open the inlet 35. Fluid from the first fluid location is consequently permitted to flow into the plenum 34. The retention feature 43 of the first fuse element 39 retains the first fuse element within the plenum 34. The plenum 34 now has a higher fluid pressure than in the inactive state due to the presence of the fluid from the first fluid location 37. When the pressure differential between the plenum 34 and the second fluid location 38 reaches the second threshold, the second fuse element 40 is configured to break at the second thin wall section 42 and open the outlet 36. Fluid is then permitted to flow from the plenum 34 to the second fluid location 38 through the outlet 36. The overpressure event is thereby relieved by permitting fluid to flow from the first fluid location 37 to the second fluid location 38 via the hydraulic fuse 30.

Figure 5:
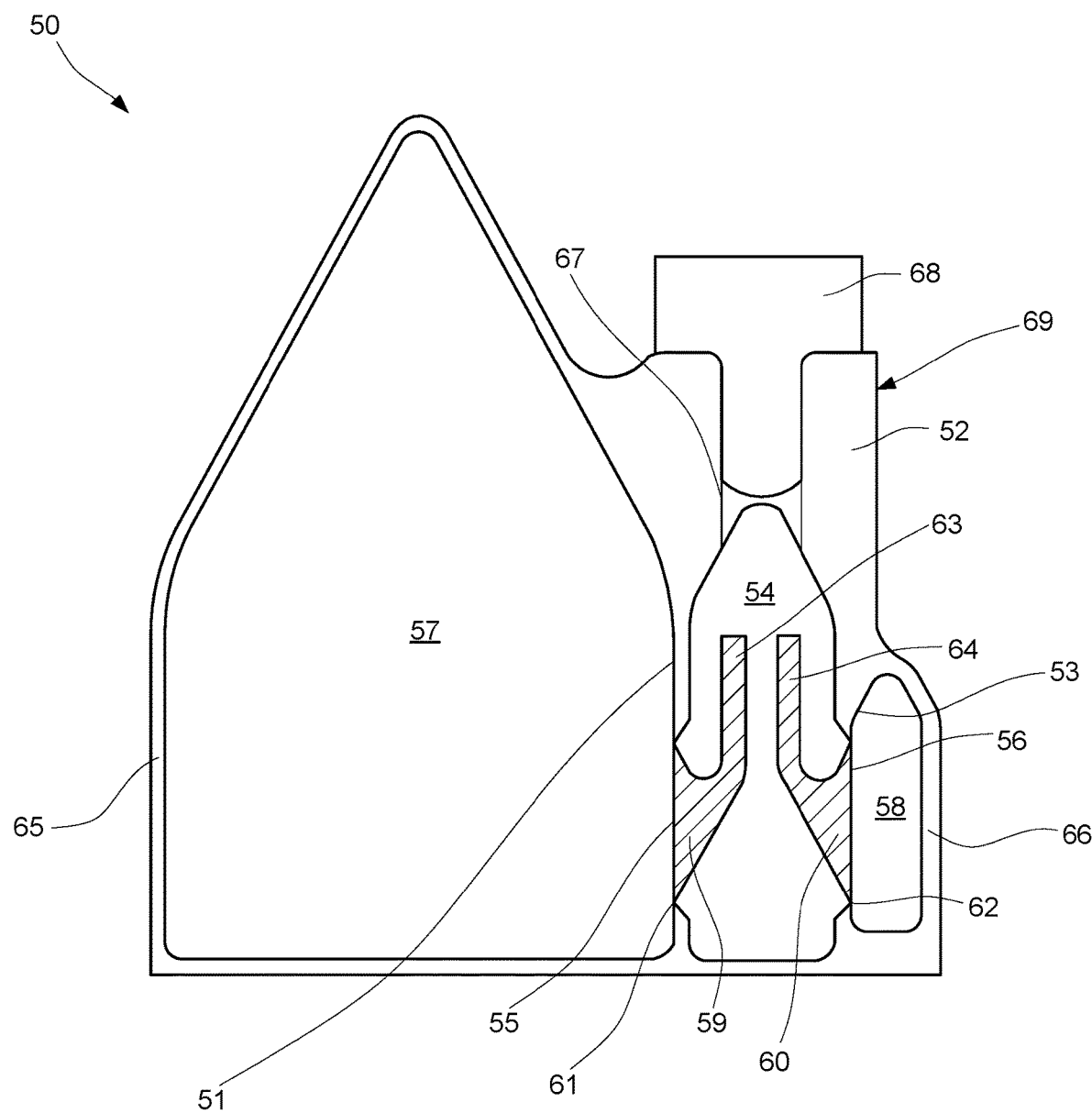
FIG. 5 is a sectional side view of a first example hydraulic manifold according to the present disclosure.

FIG. 5 shows a first example of a hydraulic manifold 50 according to the present disclosure. The hydraulic manifold 50 comprises a first fluid conduit 65 and a second fluid conduit 66. The first fluid conduit 65 and the second fluid conduit 66 are divided or separated by a manifold wall 52. The first fluid conduit 65 defines a first fluid location 57 and the second fluid conduit 58 defines a second fluid location 58. The first fluid conduit 65 is larger than the second fluid conduit 66. The first fluid conduit 65 is configured to carry fluid at a higher pressure than the second fluid conduit 66. The hydraulic manifold 50 also comprises a hydraulic fuse

69. The hydraulic fuse 69 is disposed in the manifold wall 52. In particular, the hydraulic fuse 69 is integrally formed with the manifold wall 52 such that a fuse body of the hydraulic fuse 69 is formed by the manifold wall 52. The hydraulic fuse 69 comprises a plenum 54 formed in the manifold wall 52, a first fuse element 59, and a second fuse element 60. The plenum 54 has an inlet 55 and an outlet 56. The inlet 55 is configured to fluidly couple to the first fluid location 57 in the first fluid conduit 65. The outlet 58 is configured to fluidly couple to the second fluid location 58 in the second fluid conduit 66.

The first fuse element 59 is arranged to close the inlet 55, such that fluid is prevented from entering the plenum 54 from the first fluid location 57, via the inlet 55. The second fuse element 60 is arranged to close the outlet 56, such that fluid is prevented from flowing between the plenum 54 and the second fluid location 58. The first fuse element 59 and the second fuse element 60 are integrally formed with the manifold wall 52. In particular, the first fuse element 59 is formed integrally with a portion of the manifold wall 52 which faces the first fluid location 57, and the second fuse element 60 is formed integrally with a portion of the manifold wall 52 which faces the second fluid location 58.

The first fuse element 59 and the second fuse element 60 are frangible, i.e., they are configured to be breakable. The first fuse element 59 and the second fuse element 60 may be configured to break in a brittle manner by bursting or shattering, or by breaking in a ductile manner by tearing. This may be enabled by varying the materials used for the first and second fuse elements or by varying the structure of the first and second fuse elements. The first fuse element 59 has a first thin wall section 61, which forms a first weak point between the first fuse element 59 and the manifold wall 52, and the second fuse element 60 has a second thin wall section 62, which forms a second weak point between the second fuse element 60 and the manifold wall 52. The first weak point and the second weak point form predetermined fracture points for the first and second fuse element 59, 60, respectively, such that the first fuse element 59 and the second fuse element 60 are designed to break at the first and second weak points, respectively.

Figure 6:
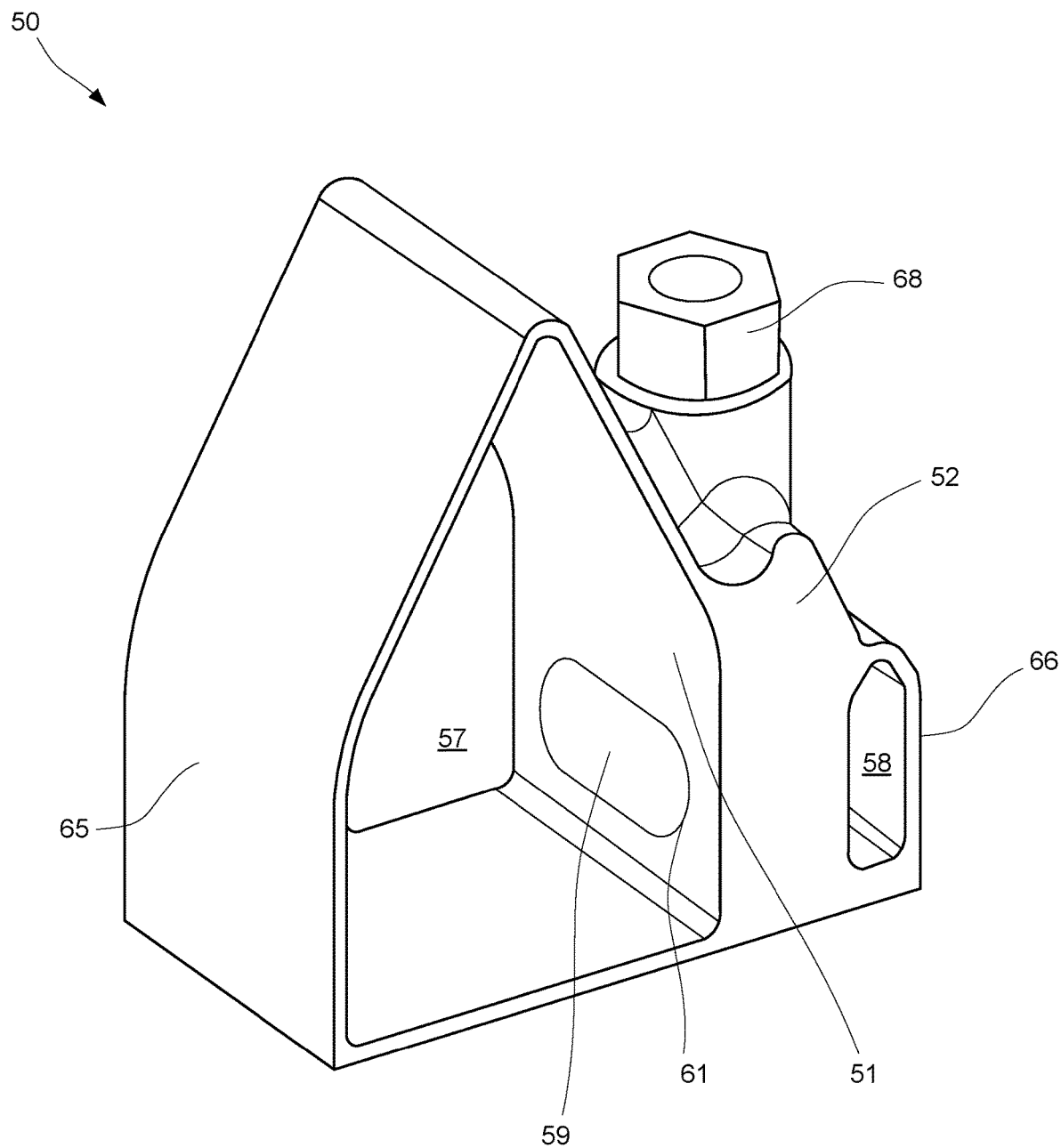
FIG. 6 is an isometric view of the first example hydraulic manifold as shown in FIG. 5.

FIG. 6 shows an isometric view of the hydraulic manifold 50. The first thin wall section 61 extends around the perimeter of the portion of the first fuse element 59 which is formed as part of the manifold wall 52. Similarly, the second thin wall section 62 extends around the perimeter of the portion of the second fuse element 60 which is formed as part of the manifold wall 52. The first thin wall section 61 is configured to break or burst when a fluid pressure differential between the first fluid location 57 and the plenum 54 reaches or exceeds a first threshold pressure. The second thin wall section 62 is configured to break or burst when a fluid pressure differential between the plenum 54 and the second fluid location 68 reaches or exceeds a second threshold pressure. The first threshold pressure is higher than the second threshold pressure. In this context, breaking or bursting means that the first thin wall section 61 is broken to at least partially open the inlet 55 and allow fluid to flow from the first fluid location 57 in the first fluid conduit 65 to the plenum 54, and the second thin wall section 62 is broken to at least partially open the outlet 56 and allow fluid to flow from the plenum 54 to the second fluid location 58 in the second fluid conduit 66. The first thin wall section 61 and the second thin wall section 62 may be configured by any means to enable it to burst above the first threshold pressure and the second threshold pressure, respectively. For example, the thickness of the thin wall sections, the surface area of the thin wall sections, and/or the materials of the thin wall sections may be selected or varied to tune or design the thin wall sections to burst at or above the desired pressure levels. For example, the first thin wall section 61 may have a greater thickness than the second thin wall section 62 to enable it to burst at a higher pressure than the second thin wall section 62.

The first fuse element 59 and the second fuse element 60 are contained within the volume circumscribed by the manifold wall 52. As shown in FIG. 6, the first fuse element 59 and the manifold wall 52 together form a first smooth, substantially continuous surface 51 of the manifold wall 52 which faces the first fluid location 57. Here, the first fuse element 59 is formed integrally with the manifold wall 52 to form the substantially continuous surface 51 which faces the first fluid location 57. Similarly, the second fuse element 60 and the manifold wall 52 together form a second smooth, substantially continuous surface 53 of the manifold wall 52 which faces the second fluid location 58. Here, the second fuse element 60 is formed integrally with the manifold wall 52 to form the substantially continuous surface 53 which faces the first fluid location 58. The first and second substantially continuous surfaces 51, 53 form substantially smooth fluid-washed surfaces which are exposed to fluid flow through the first and second fluid conduits 65, 66, respectively. The smooth surfaces ensure that there is negligible pressure loss created by the presence of the hydraulic fuse 69 in the hydraulic manifold 50.

The first fuse element 59 comprises a retention feature 63 which is configured to retain the first fuse element 59 within the plenum 54. The retention feature 63 comprises a first dovetail-shaped portion 63 which is integrally formed with the portion of the first fuse element 59 which is arranged to close the inlet 55. The width of the first dovetail-shaped portion 63 is greater than the width of the inlet 55. After the first fuse element 59 is broken off the manifold wall 52 when the first thin wall section 61 is broken, the first dovetail-shaped portion 63 prevents the first fuse element 59 from leaving the plenum 54 via the inlet 55, thereby retaining the first fuse element 59 within the plenum 54. Similarly, the second fuse element 60 also comprises a retention feature 64 which is configured to retain the second fuse element 60 within the plenum 54. The retention feature 64 comprises a second dovetail-shaped portion 64 which is integrally formed with the portion of the second fuse element 60 which is arranged to close the outlet 56. The width of the second dovetail-shaped portion 64 is greater than the width of the outlet 56. After the second fuse element 60 is broken off the manifold wall 52 when the second thin wall section 62 is broken, the second dovetail-shaped portion 64 prevents the second fuse element 60 from leaving the plenum 54 via the outlet 56, thereby retaining the second fuse element 60 within the plenum 54. In other examples, the retention feature 63, 64 may be any feature which enables the first fuse element 59 and the second fuse element 60 to be retained within the plenum 54 when the first fuse element 59 and the second fuse element 60 are broken from the manifold wall 52. For example, the retention feature may comprise a flexible member which enables the first fuse element 59 and the second fuse element 60 to remain attached to the fuse body 52 even when the first fuse element 59 and the second fuse element 60 are broken from the manifold wall 52. In other examples, the retention feature may comprise a connecting member between the first fuse element 59 and the second fuse element 60 which connects the first fuse element 59 and the second fuse element 60 together.

The hydraulic manifold 50 may be formed from an additive manufacturing process. The additive manufacturing process may be used to integrally form the first fluid conduit 65, the hydraulic fuse 69, and the second fluid conduit 66. The additive manufacturing process may include a powder bed process, a material deposition process, or a 3D printing process. For example, the powder bed process may be a laser powder bed process. Alternatively, the hydraulic manifold 50 may be formed from a casting process. The hydraulic manifold 50 may be formed from any material suitable for the desired use. For example, the hydraulic manifold 50 may be formed from a metal.

The hydraulic manifold 50 further comprises an extraction hole 67 disposed in the manifold wall 52. The extraction hole 67 is fluidly coupled with the plenum 54 and enables any material which is present in the plenum 54 to be extracted. For example, debris or powder from the manufacturing process may be present in the plenum 54 and will need to be removed before use. The extraction hole 67 is sealed by a sealing element 68. The sealing element 68 may be a fastener, such as a screw.

In use, fluid flows through the first fluid conduit 65 and the second fluid conduit 66. Fluid in the first fluid conduit 65 will be at a higher fluid pressure than fluid in the second fluid conduit 66. In normal operation, the hydraulic fuse 69 is in an inactive state, as shown in FIG. 5. Fluid in the first fluid conduit 65 will flow past the first substantially continuous surface 51 of the manifold wall 52 and fluid in the second fluid conduit 66 will flow past the second substantially continuous surface 53 of the manifold wall 52. In the inactive state, the first fuse element 59 closes the inlet 55 and the second fuse element 60 closes the outlet 56, which prevents fluid flow into and through the plenum 54. The fluid pressure in the plenum 54 may be at atmospheric pressure. During a fluid overpressure event, such as a blockage in the first fluid conduit 65, the pressure at the first fluid location 57 may increase. The hydraulic fuse 69 is caused to move to an active state when the pressure differential between the first fluid location 57 and the plenum 54 reaches the first threshold. When the pressure differential between the first fluid location 57 and the plenum 54 reaches the first threshold, the first fuse element 57 is configured to break at the first thin wall section 61 and open the inlet 55. Fluid from the first fluid location 57 in the first fluid conduit 65 is consequently permitted to flow into the plenum 54. The retention feature 63 of the first fuse element 59 retains the first fuse element 59 within the plenum 54. The plenum 54 now has a higher fluid pressure than in the inactive state due to the presence of the fluid from the first fluid location 57. When the pressure differential between the plenum 54 and the second fluid location 58 reaches the second threshold, the second fuse element 60 is configured to break at the second thin wall section 62 and open the outlet 56. The retention feature 64 of the second fuse element 60 retains the second fuse element 60 within the plenum 54. Fluid is then permitted to flow from the plenum 54 to the second fluid location 58 in the second fluid conduit 66 through the outlet 56. The overpressure event is thereby relieved by permitting fluid to flow from the first fluid location 57 in the first fluid conduit 65 to the second fluid location 58 in the second fluid conduit 66 via the hydraulic fuse 69.

Figure 7:
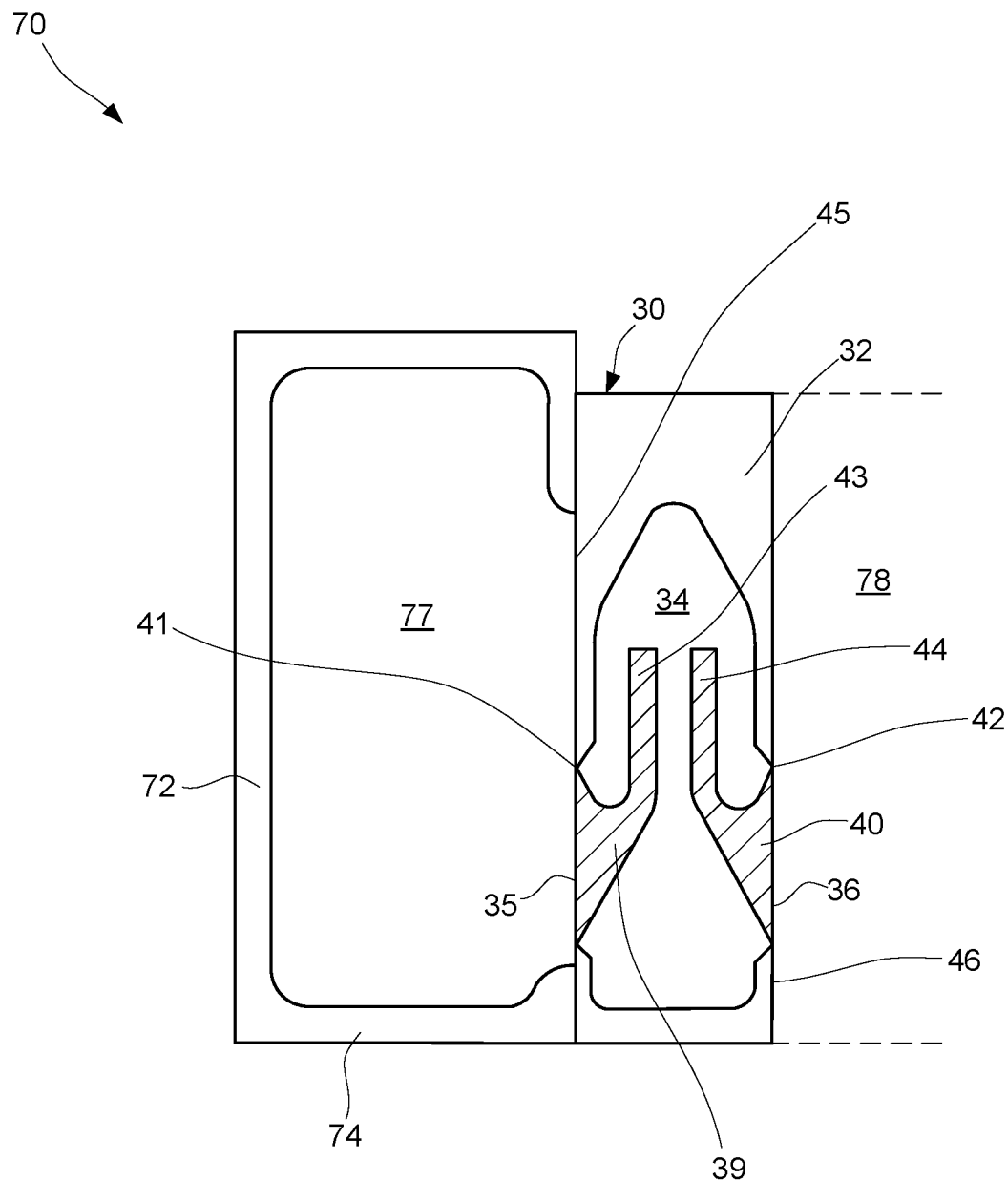
FIG. 7 is a sectional side view of a second example hydraulic manifold according to the present disclosure.

FIG. 7 shows a second example of a hydraulic manifold 70 according to the present disclosure. The second example hydraulic manifold 70 comprises a fluid conduit 72 and a hydraulic fuse 30. The hydraulic fuse 30 is substantially similar to the hydraulic fuse 30 described with reference to FIGS. 2-4, with like reference numerals denoting like features.

The fluid conduit 72 carries a flow of a fluid therethrough. The fluid conduit 72 comprises a manifold wall 74 which defines a first fluid location 77. The hydraulic fuse 30 is attached to the manifold wall 74 such that the inlet 35 of the hydraulic fuse 30 is configured to fluidly couple to the first fluid location 77 in the fluid conduit 72. The outlet 36 of the hydraulic fuse 30 is configured to fluidly couple to ambient conditions, for example to an environment around the hydraulic manifold 70. The ambient conditions therefore form the second fluid location 78. The hydraulic fuse 30 may be attached to the manifold wall 74 using any suitable fasteners. In other examples, the hydraulic fuse 30 may be integrally formed with the manifold wall 74.

The hydraulic fuse 30 comprises a first fuse element 39 and a second fuse element 40, as described with reference to FIGS. 2-4. The first fuse element 39 is arranged to close the inlet 35, such that fluid is prevented from entering the plenum 34 from the first fluid location 77 in the fluid conduit 72, via the inlet 35. The second fuse element 40 is arranged to close the outlet 36, such that fluid is prevented from flowing between the plenum 34 and the second fluid location 78. The first fuse element 39 and the second fuse element 40 are integrally formed with the fuse body 32. In particular, the first fuse element 39 is formed integrally with a wall of the fuse body 32 which faces the first fluid location 77, and the second fuse element 40 is formed integrally with a wall of the fuse body 32 which faces the second fluid location 78. The first and second fuse elements 39, 40 are frangible, as described previously. The first fuse element 39 and the fuse body 32 together form a first smooth, substantially continuous surface 45 of the fuse body 32 which faces the first fluid location 77. Here, the first fuse element 39 is formed integrally with the fuse body 32 to form the substantially continuous surface 45 which faces the first fluid location 77. Similarly, the second fuse element 40 and the fuse body 32 together form a second smooth, substantially continuous surface 46 of the fuse body 32 which faces the second fluid location 78. Here, the second fuse element 40 is formed integrally with the fuse body 32 to form the substantially continuous surface 46 which faces the first fluid location 78. The substantially continuous surfaces 45, 46 form substantially smooth fluid-washed surfaces which are exposed to fluid flow.

In normal operation, the hydraulic fuse 30 is in an inactive state, as shown in FIG. 7. Fluid flows through the fluid conduit 72 and past the first substantially continuous surface 45 of the hydraulic fuse 30. In the inactive state, the first fuse element 39 closes the inlet 35 and the second fuse element 40 closes the outlet 36, which prevents fluid flow into and through the plenum 34. The fluid pressure in the plenum 34 may be at atmospheric pressure. During a fluid overpressure event, such as a blockage in the fluid conduit 72, the pressure in the first fluid location 77 may increase. The hydraulic fuse 30 is caused to move to an active state when the pressure differential between the first fluid location 77 and the plenum 34 reaches the first threshold. When the pressure differential between the first fluid location 77 and the plenum 34 reaches the first threshold, the first fuse element 39 is configured to break at the first thin wall section 41 and open the inlet 35. Fluid from the first fluid location 77 is consequently permitted to flow into the plenum 34. The retention feature 43 of the first fuse element 43 retains the first fuse element within the plenum 34. The plenum 34 now has a higher fluid pressure than in the inactive state due to the presence of the fluid from the first fluid location 77. When the pressure differential between the plenum 34 and the second fluid location 78 reaches the second threshold, the second fuse element 40 is configured to break at the second thin wall section 42 and open the outlet 36. The second threshold will be quickly reached as the second fluid location 88 is at atmospheric pressure. Therefore, the second fuse element 40 will be broken soon after the first fuse element 39 is broken. Fluid is then permitted to flow from the plenum 34 to the second fluid location 78 through the outlet 36, with the second fluid location 78 being in the ambient surroundings. The overpressure event is thereby relieved by permitting fluid to flow from the first fluid location 37 to the second fluid location 78 via the hydraulic fuse 30. The hydraulic fuse 30 therefore functions as a pressure relief device which vents to atmospheric pressure in the case of an overpressure event or a pressure surge in the fluid conduit 72.

Figure 8:
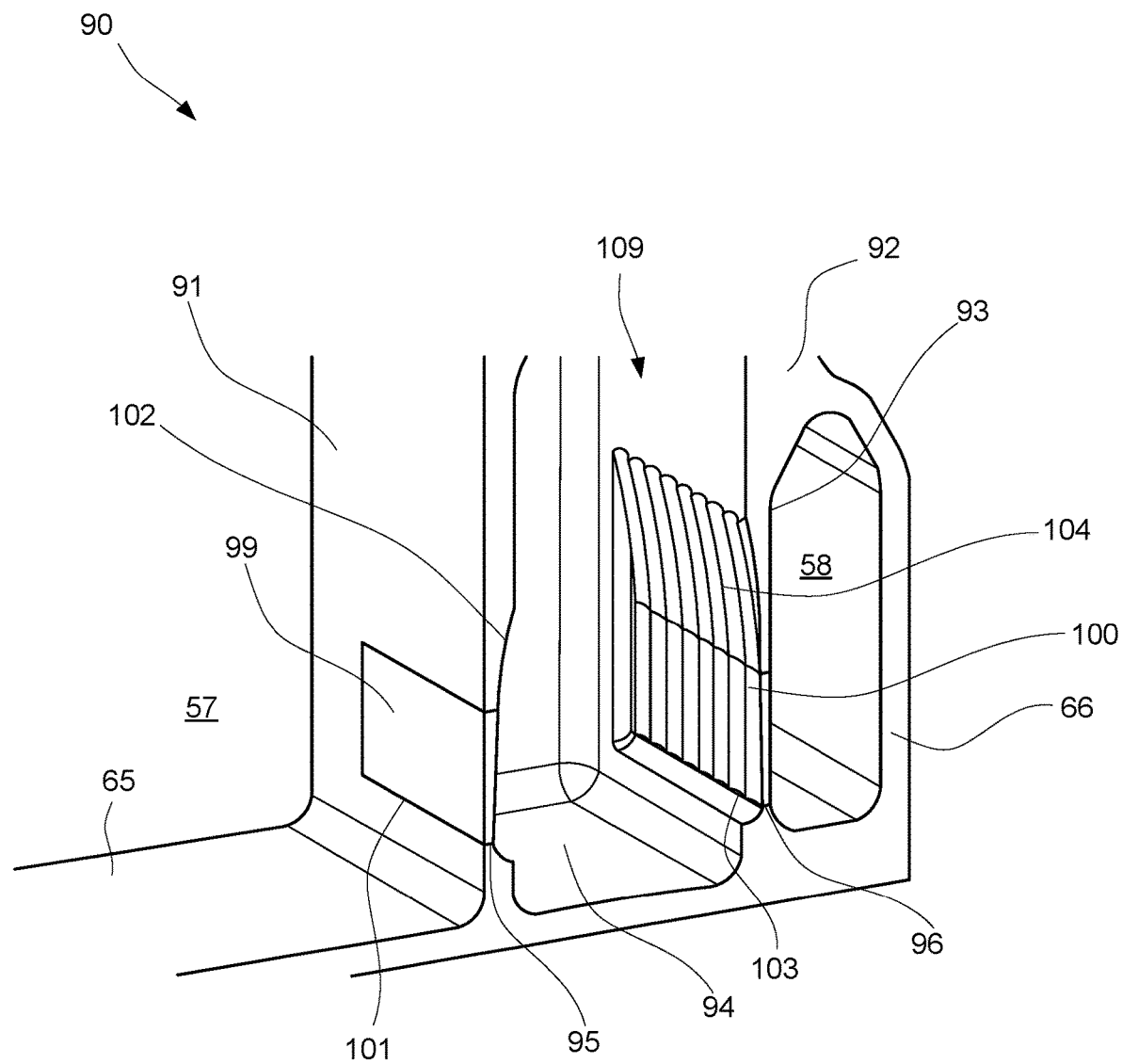
FIG. 8 is a isometric partial view of a third example hydraulic manifold according to the present disclosure.

FIG. 8 shows a third example of a hydraulic manifold according to the present disclosure. The third example hydraulic manifold is substantially similar to the first example hydraulic manifold described with reference to FIGS. 5-6, with like reference numerals denoting like features. The third example hydraulic manifold differs with respect to the first and second fuse elements.

The hydraulic manifold 90 comprises a first fluid conduit 65 and a second fluid conduit 66. The first fluid conduit 65 and the second fluid conduit 66 are divided or separated by a manifold wall 92. The first fluid conduit 65 defines a first fluid location 57 and the second fluid conduit 58 defines a second fluid location 58. The first fluid conduit 65 is larger than the second fluid conduit 66. The first fluid conduit 65 is configured to carry fluid at a higher pressure than the second fluid conduit 66. The hydraulic manifold 50 also comprises a hydraulic fuse 109. The hydraulic fuse 109 is disposed in the manifold wall 92. In particular, the hydraulic fuse 109 is integrally formed with the manifold wall 92 such that a fuse body of the hydraulic fuse 109 is formed by the manifold wall 92. The hydraulic fuse 109 comprises a plenum 94 formed in the manifold wall 92, a first fuse element 99, and a second fuse element 100. The plenum 94 has an inlet 95 and an outlet 96. The inlet 95 is configured to fluidly couple to the first fluid location 57 in the first fluid conduit 65. The outlet 96 is configured to fluidly couple to the second fluid location 58 in the second fluid conduit 66.

The first fuse element 99 is arranged to close the inlet 95, such that fluid is prevented from entering the plenum 94 from the first fluid location 57, via the inlet 95. The second fuse element 100 is arranged to close the outlet 96, such that fluid is prevented from flowing between the plenum 94 and the second fluid location 58. The first fuse element 99 and the second fuse element 100 are integrally formed with the manifold wall 92. In particular, the first fuse element 99 is formed integrally with a portion of the manifold wall 92 which faces the first fluid location 57, and the second fuse element 100 is formed integrally with a portion of the manifold wall 92 which faces the second fluid location 58.

The first fuse element 99 and the second fuse element 100 are configured to fracture away from the manifold wall 92. In particular, the first fuse element 99 and the second fuse element 100 are configured to tear away from the manifold wall 99. The thickness of the first fuse element 99 is tapered to a thinnest point at a bottom edge 101 of the first fuse element 99. Similarly, the thickness of the second fuse element 100 is tapered to a thinnest point at a bottom edge 103 of the second fuse element 100. By being the thinnest points of the manifold wall 92, the bottom edge 101 of the first fuse element 99 forms a first weak point between the first fuse element 99 and the manifold wall 92, and the bottom edge 103 of the second fuse element 100 forms a second weak point between the second fuse element 100 and the manifold wall 92. The first weak point and the second weak point form predetermined fracture points for the first and second fuse element 99, 100, respectively, such that the first fuse element 99 and the second fuse element 100 are designed to fracture at the first and second weak points, respectively. The bottom edge 101 of the first fuse element 99 is configured to fracture when a fluid pressure differential between the first fluid location 57 and the plenum 94 reaches a first threshold pressure. The bottom edge 103 of the second fuse element 100 is configured to fracture when a fluid pressure differential between the plenum 94 and the second fluid location 58 reaches a second threshold pressure. The first threshold pressure is higher than the second threshold pressure. The first fuse element 99 and the second fuse element 100 are formed from ductile materials, such as aluminium, such that the first fuse element 99 is configured to fracture at its bottom edge 101 in a ductile manner, and the second fuse element 100 is configured to fracture at its bottom edge 103 in a ductile manner. This means that the first fuse element 99 is configured to tear at its bottom edge 101 when the fluid pressure differential between the first fluid location 57 and the plenum 94 reaches the first threshold pressure, thus at least partially opening the inlet 95 and allowing fluid to flow from the first fluid location 57 to the plenum 94. The second fuse element 100 is also configured to tear at its bottom edge 103 when the fluid pressure differential between the plenum 94 and the second fluid location 58 reaches the second threshold pressure, thus at least partially opening the outlet 96 and allowing fluid to flow from the plenum 94 to the second fluid location 58. The thickness of the manifold wall at the bottom edges, the length of the bottom edges, the surface area of the fuse elements, and/or the materials of the fuse elements may be selected or varied to tune or design the bottom edges to fracture at or above the desired pressure thresholds. For example, the bottom edge 101 of the first fuse element 99 may have a greater thickness than the bottom edge 103 of the second fuse element 100 to enable it to fracture at a higher pressure than the bottom edge 101 of the first fuse element 99. In other examples, the first weak point and the second weak point may be formed by other edges or points of the first fuse element and the second fuse element, respectively.

The first fuse element 99 and the second fuse element 100 are contained within the volume circumscribed by the manifold wall 92. The first fuse element 99 and the manifold wall 92 together form a first smooth, substantially continuous surface 91 of the manifold wall 92 which faces the first fluid location 57. In particular, the first fuse element 99 is formed integrally with the manifold wall 92 to form the substantially continuous surface 91 which faces the first fluid location 57. Similarly, the second fuse element 100 and the manifold wall 92 together form a second smooth, substantially continuous surface 93 of the manifold wall 92 which faces the second fluid location 58. Here, the second fuse element 100 is formed integrally with the manifold wall 92 to form the substantially continuous surface 93 which faces the first fluid location 58. The first and second substantially continuous surfaces 91, 93 form substantially smooth fluid-washed surfaces which are exposed to fluid flow through the first and second fluid conduits 65, 66, respectively. The smooth surfaces ensure that there is negligible pressure loss created by the presence of the hydraulic fuse 109 in the hydraulic manifold 90.

The first fuse element 99 comprises a retention feature 102 which is configured to retain the first fuse element 99 within the plenum 94. The retention feature 102 comprises a first series of ridges 102 which are integrally formed on an inner surface of the manifold wall 92 and the first fuse element 99, the inner surface facing the plenum 94. Each of the first series of ridges 102 extends substantially vertically across the manifold wall 92 and the first fuse element 99. The first series of ridges 102 provide a degree of flexibility to the manifold wall 92 and the first fuse element 99, so that the first fuse element 99 is flexibly attached to the manifold wall 92. The first series of ridges 102 therefore enable the manifold wall 92 and the first fuse element 99 to bend together when the bottom edge 101 of the first fuse element 99 is torn. This ensures that the first fuse element 99 remains attached to the manifold wall 92 even when the bottom edge 101 is torn, thereby retaining the first fuse element within the plenum 94 and preventing it from entering the first fluid conduit 65. Similarly, the second fuse element 100 also comprises a retention feature 104 which is configured to retain the second fuse element 100 within the plenum 94. The retention feature 104 comprises a second series of ridges 104 which are integrally formed on an inner surface of the manifold wall 92 and the second fuse element 100, the inner surface facing the plenum 94. Each of the second series of ridges 104 extends substantially vertically across the manifold wall 92 and the first fuse element 99. The second series of ridges 104 provide a degree of flexibility to the manifold wall 92 and the second fuse element 100 so that the second fuse element 100 is flexibly attached to the manifold wall 92. The second series of ridges 104 therefore enable the manifold wall 92 and the second fuse element 100 to bend together when the bottom edge 103 of the second fuse element 100 is torn. This ensures that the second fuse element 100 remains attached to the manifold wall 92 even when the bottom edge 103 is torn, thereby retaining the second fuse element within the plenum 94 and preventing it from entering the second fluid conduit 66. In other examples, the retention feature may be any feature which enables the first fuse element 99 and the second fuse element 100 to be retained within the plenum 94 when the first fuse element 99 and the second fuse element 100 are fractured away from the manifold wall 92. In other examples, one of the first fuse element and the second fuse element may be flexibly attached to the manifold wall, as described above, and the other of the first fuse element and the second fuse element may be rigidly attached to or formed with the manifold wall, for example as described with reference to FIGS. 5-6.

The hydraulic manifold 90 may be formed from an additive manufacturing process. The additive manufacturing process may be used to integrally form the first fluid conduit 65, the hydraulic fuse 109, and the second fluid conduit 66. The additive manufacturing process may include a powder bed process, a material deposition process, or a 3D printing process. For example, the powder bed process may be a laser powder bed process. The hydraulic manifold 90 may be formed from any material suitable for the desired use. For example, the hydraulic manifold 90 may be formed from a ductile material, such as aluminium.

In use, fluid flows through the first fluid conduit 65 and the second fluid conduit 66. Fluid in the first fluid conduit 65 will be at a higher fluid pressure than fluid in the second fluid conduit 66. In normal operation, the hydraulic fuse 109 is in an inactive state, as shown in FIG. 8. Fluid in the first fluid conduit 65 will flow past the first substantially continuous surface 91 of the manifold wall 92 and fluid in the second fluid conduit 66 will flow past the second substantially continuous surface 93 of the manifold wall 92. In the inactive state, the first fuse element 99 closes the inlet 95 and the second fuse element 100 closes the outlet 96, which prevents fluid flow into and through the plenum 94. The fluid pressure in the plenum 94 may be at atmospheric pressure. During a fluid overpressure event, such as a blockage in the first fluid conduit 65, the pressure at the first fluid location 57 may increase. The hydraulic fuse 109 is caused to move to an active state when the pressure differential between the first fluid location 57 and the plenum 94 reaches the first threshold. When the pressure differential between the first fluid location 57 and the plenum 94 reaches the first threshold, the first fuse element 99 is configured to tear at its bottom edge 101 and open the inlet 95. Fluid from the first fluid location 57 in the first fluid conduit 65 is consequently permitted to flow into the plenum 94. The retention feature 102 of the first fuse element 99 retains the first fuse element 99 within the plenum 94, as the first fuse element 99 and the manifold wall 92 bend together due to the presence of the ridges 102. The plenum 94 now has a higher fluid pressure than in the inactive state due to the presence of the fluid from the first fluid location 57. When the pressure differential between the plenum 94 and the second fluid location 58 reaches the second threshold, the second fuse element 100 is configured to tear at its bottom edge 103 and open the outlet 96. The retention feature 104 of the second fuse element 100 retains the second fuse element 100 within the plenum 94, as the second fuse element 100 and the manifold wall 92 bend together due to the presence of the ridges 104. Fluid is then permitted to flow from the plenum 94 to the second fluid location 58 in the second fluid conduit 66 through the outlet 96. The overpressure event is thereby relieved by permitting fluid to flow from the first fluid location 57 in the first fluid conduit 65 to the second fluid location 58 in the second fluid conduit 66 via the hydraulic fuse 109.

The hydraulic fuse and the hydraulic manifold of the present disclosure provide improved reliability of activation of the fuse. By having a plenum between the first fluid location and the second fluid location, the first fluid location is isolated from the second fluid location, so that the hydraulic fuse can operate independently of any transient or dynamic pressure differential between the first fluid location and the second fluid location. The hydraulic fuse provides a first fuse element between the first fluid location and the plenum and a second fuse element between the plenum and the second fluid location, when enables the hydraulic fuse to be activated when the pressure differential between the first fluid location and the plenum exceeds a designed threshold pressure. The activation of the hydraulic fuse is therefore not affected by variations in pressure at the second fluid location relative to the first fluid location. This ensures that the hydraulic fuse is able to reliably activate at the designed threshold pressure. The structure of the hydraulic fuse has low complexity and reduced mass compared to known hydraulic fuses. The hydraulic fuse can be readily tuned to the desired pressure thresholds required in use, by adapting the first and second fuse elements. The hydraulic fuse also presents smooth, continuous surfaces to the fluid flow at the first and second fluid locations, thereby minimising pressure loss due to the presence of the hydraulic fuse in a fluid system or a hydraulic manifold. The retention features ensure that the first and second fuse elements are retained within the plenum even after the fuse has been activated, reducing the risk of debris entering other parts of the hydraulic manifold or fluid system and causing blockages. The hydraulic fuse and the hydraulic manifold can be manufactured integrally with each other, which enables the hydraulic fuse to be easily embedded within the hydraulic manifold in a simple and compact manner. The hydraulic fuse and the hydraulic manifold can be manufactured using an additive manufacturing process, which reduces manufacturing time and enables the hydraulic fuse to be located in optimal locations in the hydraulic manifold.

Although it has been described in the above examples that the first fuse element and the second fuse element are configured to be frangible or breakable, in other examples, the first fuse element and the second fuse element may be otherwise configured to move to open the inlet and the outlet, respectively, without breaking. For example, each of the first and second fuse elements may have respective opening mechanisms that allow the inlet to be opened when the pressure differential between the first fluid location and the plenum exceeds the first threshold and allow the outlet to be opened when the pressure differential between the plenum and the second fluid location exceeds the second threshold. In further examples, one of the first fuse element and the second fuse element may be frangible, and the other of the first fuse element and the second fuse element may not be frangible and may be otherwise configured to open the inlet or the outlet. The opening mechanisms may also be reversible, in that the first fuse element may be configured to re-close the inlet when the pressure differential between the first fluid location and the plenum falls below the first threshold and that the second fuse element may be configured to re-close the outlet when the pressure differential between the plenum and the second fluid location falls below the second threshold. In this way, the hydraulic fuse may be reusable.

Although it has been described in the above examples that the first and second fuse elements are integrally formed with the fuse body or the manifold wall, in other examples, the first and second fuse elements may be otherwise arranged with respect to the fuse body or manifold wall. For example, the first and second fuse elements may be attached to the fuse body or manifold wall.

Although it has been described in the above examples that the first and second fuse elements are configured to fracture at predetermined weak points or predetermined fracture points, in other examples, the first and second fuse elements may be configured to fracture at one or more points which are not predetermined. For instance, the first or second fuse elements may have multiple weak points and the fuse element may fracture at any of these points, without it being predetermined that the fuse element will fracture at a specific one of these points.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A hydraulic fuse comprising:
    a fuse body defining a plenum, the plenum comprising:
        an inlet configured to couple to a first fluid location; and
        an outlet configured to couple to a second fluid location;
    a first fuse element arranged to close the inlet, the first fuse element configured to open the inlet when a pressure differential between the first fluid location and the plenum reaches a first threshold;
    a second fuse element arranged to close the outlet, the second fuse element configured to open the outlet when a pressure differential between the plenum and the second fluid location reaches a second threshold, wherein the first threshold is higher than the second threshold;
    an extraction hole opening into the plenum;
    a sealing element configured to close the extraction hole;
    wherein in an inactive state, the inlet is closed by the first fuse element and the outlet is closed by the second fuse element to prevent fluid flow through the plenum; and
    wherein in an active state, the pressure differential between the first fluid location and the plenum reaches the first threshold to cause the first fuse element to open and permit fluid flow through the inlet, and the pressure differential between the plenum and the second fluid location reaches the second threshold to cause the second fuse element to open and permit fluid flow through the outlet.

2. The hydraulic fuse as claimed in claim 1, wherein the first fuse element is frangible, such that the first fuse element is configured to fracture and open the inlet when the pressure differential between the first fluid location and the plenum reaches the first threshold, and/or the second fuse element is frangible, such that the second fuse element is configured to fracture and open the outlet when the pressure differential between the plenum and the second fluid location reaches the second threshold.

3. The hydraulic fuse as claimed in claim 2, wherein the first fuse element and/or the second fuse element are configured to fracture at a respective predetermined fracture location.

4. The hydraulic fuse as claimed in claim 1, wherein the first fuse element and the second fuse element are integrally formed with the fuse body.

5. The hydraulic fuse as claimed in claim 1, wherein the first fuse element and the second fuse element each comprise a respective retention feature configured to retain the first fuse element and the second fuse element within the plenum in the active state.

6. The hydraulic fuse as claimed in claim 5, wherein a width of the retention feature is larger than a width of the inlet and outlet.

7. The hydraulic fuse as claimed in claim 5, wherein the first fuse element and/or the second fuse element are flexibly attached to the fuse body, such that in the active state, the first fuse element and/or the second fuse element are configured to bend and remain attached to the fuse body to provide the retention feature.

8. The hydraulic fuse as claimed in claim 7, wherein the first fuse element and/or the second fuse element comprises a plurality of ridges formed on a surface facing into the plenum.

9. The hydraulic fuse as claimed in claim 1, wherein the first fuse element and the second fuse element are contained within a volume circumscribed by the fuse body.

10. The hydraulic fuse as claimed in claim 1, wherein in the inactive state, the first fuse element and the fuse body form a substantially continuous fluid-washed surface facing the first fluid location, and the second fuse element and the fuse body form a substantially continuous fluid-washed surface facing the second fluid location.

11. A hydraulic manifold comprising:
    a first fluid conduit and a second fluid conduit separated by a manifold wall; and
    a hydraulic fuse according to claim 1, wherein the hydraulic fuse is disposed in the manifold wall between the first fluid conduit and the second fluid conduit, such that the first fluid location is in the first fluid conduit and the second fluid location is in the second fluid conduit.

12. The hydraulic manifold as claimed in claim 11, wherein the hydraulic fuse is integrally formed with the manifold wall.

13. A hydraulic manifold comprising:
a fluid conduit defined by a manifold wall; and
a hydraulic fuse according to claim 1;
wherein the hydraulic fuse is attached to the manifold wall, such that the first fluid location is in the fluid conduit and the second fluid location is an environment surrounding the hydraulic manifold.

14. The hydraulic manifold as claimed in claim 13, wherein the hydraulic fuse is integrally formed with the manifold wall.

15. A hydraulic fuse comprising:
a fuse body defining a plenum, the plenum comprising:
an inlet configured to couple to a first fluid location; and
an outlet configured to couple to a second fluid location;
a first fuse element arranged to close the inlet, the first fuse element configured to open the inlet when a pressure differential between the first fluid location and the plenum reaches a first threshold;
a second fuse element arranged to close the outlet, the second fuse element configured to open the outlet when a pressure differential between the plenum and the second fluid location reaches a second threshold, wherein the first threshold is higher than the second threshold;
wherein in an inactive state, the inlet is closed by the first fuse element and the outlet is closed by the second fuse element to prevent fluid flow through the plenum; and
wherein in an active state, the pressure differential between the first fluid location and the plenum reaches the first threshold to cause the first fuse element to open and permit fluid flow through the inlet, and the pressure differential between the plenum and the second fluid location reaches the second threshold to cause the second fuse element to open and permit fluid flow through the outlet;
wherein the first fuse element and the second fuse element each comprise a respective retention feature configured to retain the first fuse element and the second fuse element within the plenum in the active state;
wherein the first fuse element and/or the second fuse element are flexibly attached to the fuse body, such that in the active state, the first fuse element and/or the second fuse element are configured to bend and remain attached to the fuse body to provide the retention feature; and wherein the first fuse element and/or the second fuse element comprises a plurality of ridges formed on a surface facing into the plenum.

16. A hydraulic fuse comprising:
a fuse body defining a plenum, the plenum comprising:
an inlet configured to couple to a first fluid location; and
an outlet configured to couple to a second fluid location;
a first fuse element arranged to close the inlet, the first fuse element configured to open the inlet when a pressure differential between the first fluid location and the plenum reaches a first threshold;
a second fuse element arranged to close the outlet, the second fuse element configured to open the outlet when a pressure differential between the plenum and the second fluid location reaches a second threshold, wherein the first threshold is higher than the second threshold;
wherein in an inactive state, the inlet is closed by the first fuse element and the outlet is closed by the second fuse element to prevent fluid flow through the plenum; and
wherein in an active state, the pressure differential between the first fluid location and the plenum reaches the first threshold to cause the first fuse element to open and permit fluid flow through the inlet, and the pressure differential between the plenum and the second fluid location reaches the second threshold to cause the second fuse element to open and permit fluid flow through the outlet;
wherein the first fuse element and the second fuse element each comprise a respective retention feature configured to retain the first fuse element and the second fuse element within the plenum in the active state when the respective fuse element has completely detached form the fuse body.

17. The hydraulic fuse as claimed in claim 16, wherein a width of the retention feature is larger than a width of the inlet and outlet.

18. The hydraulic fuse as claimed in claim 16, wherein the first fuse element is frangible, such that the first fuse element is configured to fracture and open the inlet when the pressure differential between the first fluid location and the plenum reaches the first threshold, and/or the second fuse element is frangible, such that the second fuse element is configured to fracture and open the outlet when the pressure differential between the plenum and the second fluid location reaches the second threshold.

19. The hydraulic fuse as claimed in claim 18, wherein the first fuse element and/or the second fuse element are configured to fracture at a respective predetermined fracture location.

* * * * *